Sept. 8, 1970          H. SIEBOL          3,527,036

HOP PICKING MACHINE

Filed Oct. 11, 1967          3 Sheets-Sheet 2

INVENTOR.
HENRY SIEBOL

BY

ATTORNEYS

Sept. 8, 1970  H. SIEBOL  3,527,036
HOP PICKING MACHINE
Filed Oct. 11, 1967  3 Sheets-Sheet 3

INVENTOR.
HENRY SIEBOL
BY
ATTORNEYS

United States Patent Office 3,527,036
Patented Sept. 8, 1970

3,527,036
HOP PICKING MACHINE
Henry Siebol, Rte. 1, Outlook, Wash. 98938
Filed Oct. 11, 1967, Ser. No. 674,592
Int. Cl. A01d 45/22
U.S. Cl. 56—130                                    11 Claims

ABSTRACT OF THE DISCLOSURE

A hop-picking machine for stripping hop vines in the field and having picker units comprising two sets of inclined picker frames. The picker frames are inclined longitudinally of the machine and are also inclined laterally with the width of the outboard frame in each set being less than the width of the inboard frame. Each picker frame has endless chains or belts mounting a plurality of picker bars which carry picker fingers. The fingers move horizontally and in a longitudinal direction opposite from the direction in which the hop vines are pulled between the frames as the machine advances. A conveyor belt removes the cones or clusters of hops to be further separated and cleaned and the stripped vines are deposited on the ground as the machine advances.

BACKGROUND OF THE INVENTION

The present invention relates to portable hop-picking machines and more particularly to a portable hop-picking machine of the type wherein the hop vine is not cut at its lower or butt end but it is released from the overhead row wire and falls by gravity to be pulled between banks of moving picker fingers as a result of the forward travel of the machine.

In the prior art, the most common form of portable hop-picking machine is of the type wherein the vine is severed at its bottom end, the top is released from the row wire, and the entire vine is manually placed on a feeding table where the butt end of the vine is attached to a grasper bar for moving between banks of picking fingers disposed in either a vertical or horizontal plane. One well known machine of this type is the Thys Portable Hop Picker disclosed in U.S. Patent No. 2,114,727.

Several designs of hop-picking machines have been proposed which work on the prinicple of pulling a hop vine between sets of picking fingers as a result of the advance of the machine. Examples of this type of hop-picking machine are illustrated in U.S. Pat. Nos. 2,447,122 and 2,645,893. These machines have not become widely accepted, however, and the majority of the hop vines are stripped either by stationary machines or by portable devices utilizing hand labor to cut the vines and manually feed them into the picker.

The present invention has the object of providing an improved portable hop-picking machine which minimizes the manual labor involved in hop picking and wherein the complete hop vine may be caused to fall by gravity and be received between two banks of moving picking fingers to be stripped. Because of the orientation of the banks of picking fingers, the entire length of the hop vine is received between these picking fingers and is then pulled longitudinally out of the machine as the machine advances. With this type of action, more than one vine may be received by the picker at any given time and two adjacent row wires may be picked at one time.

Another object of the present invention is to provide an improved portable hop-picking machine of the character described wherein the banks of picking fingers extend generally longitudinally of the machine and the picking fingers move in a direction opposite the direction of travel of the machine and wherein the banks of fingers are inclined longitudinally rearwardly and laterally inwardly so as to keep the vine extended and supported while it is being stripped and removed from between the banks of picking fingers.

Another object of the present invention is to provide a hop-picking machine of the character described wherein the distance between the upper longitudinal edges of the banks of moving picking fingers is greater than the distance between the lower longitudinal edges and wherein the width or vertical height of the outboard bank of fingers is less than the vertical height of the inboard bank.

Other objects and advantages of the present invention will be apparent to those skilled in the art from the following specification and from the accompanying drawings wherein.

Figure 1:
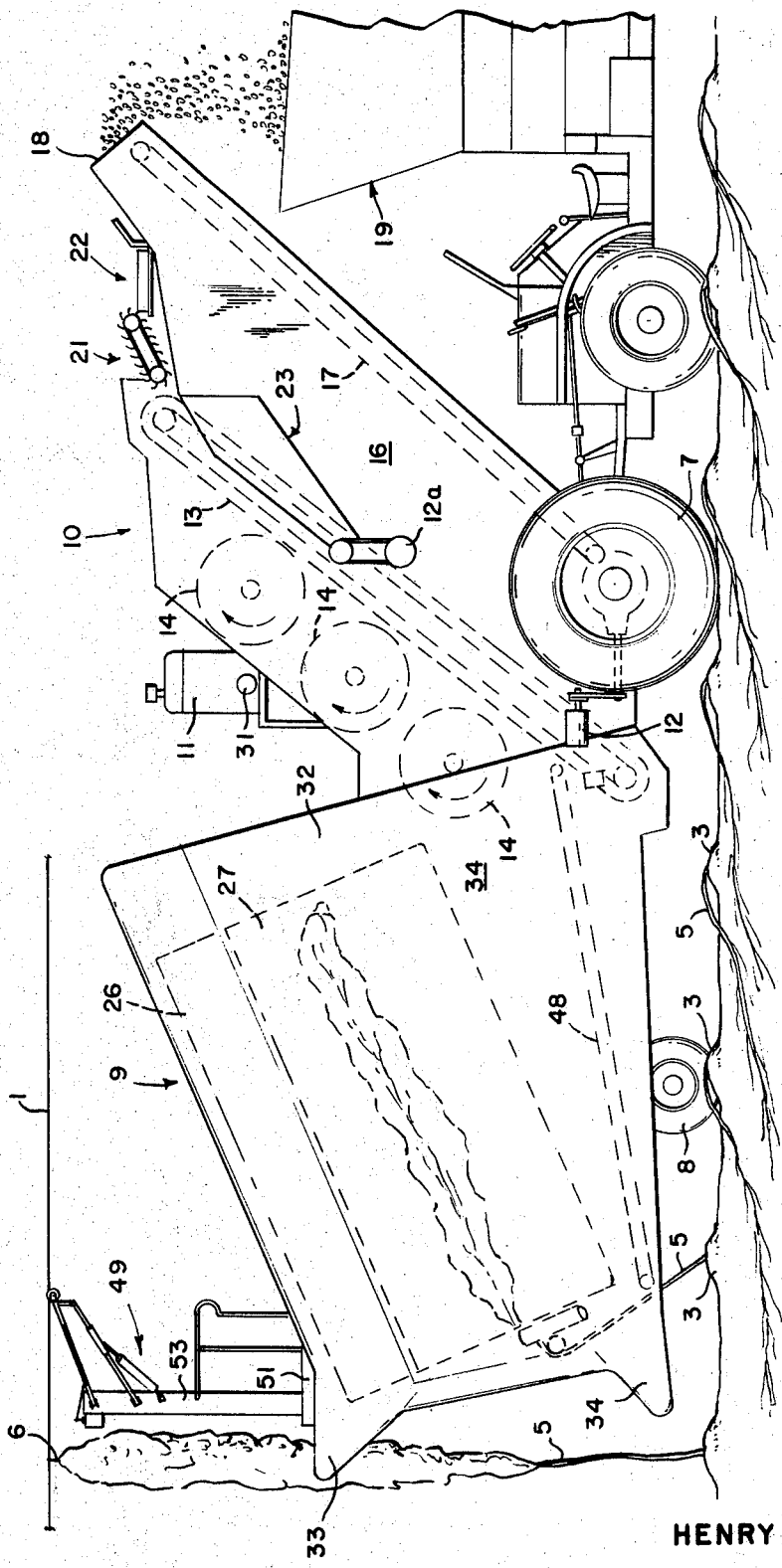
FIG. 1 is a side elevational view of the hop-picking machine according to the present invention as it appears during operation in the field.
Figure 2:
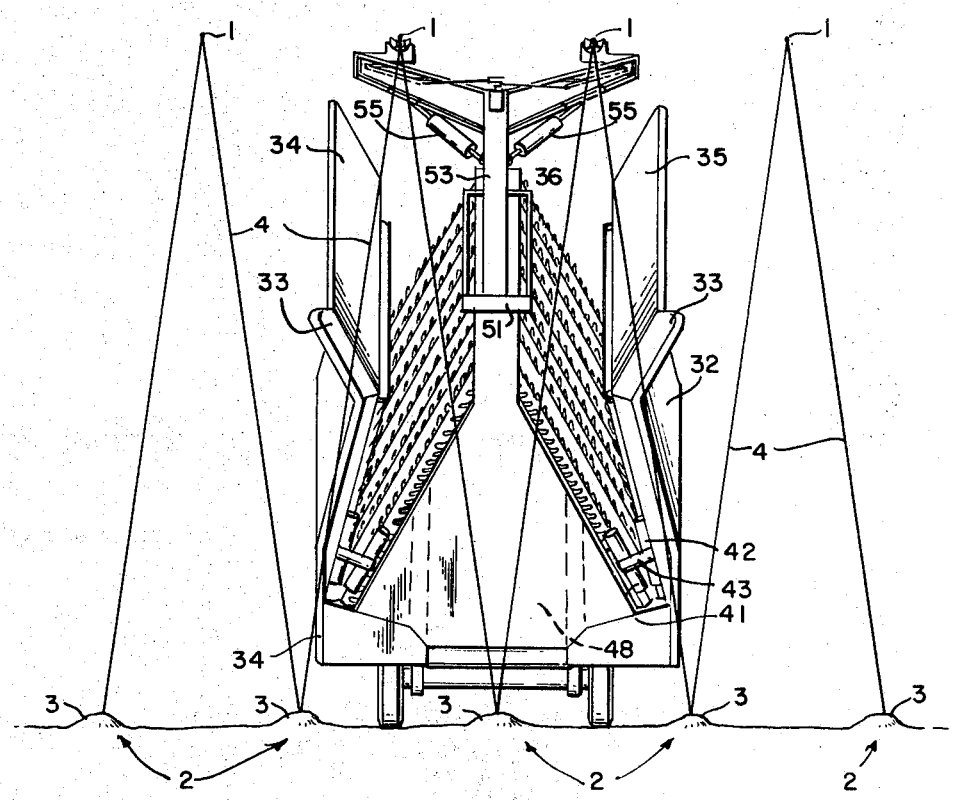
FIG. 2 is a front perspective of the machine.

Referring to FIGS. 1 and 2, the commonly used hill and trellis arrangement for hop yards includes parallel overhead row wires 1 which are usually about seven feet apart. These wires are generally placed about eighteen feet above the ground and are supported by trellis poles, not shown. The parallel hop rows 2 are generally centered between the row wires and each hop row has the individual hills 3 longitudinally spaced approximately seven feet apart. As illustrated in FIG. 2, each hill 3 is usually provided with a stake and two strings 4 for training at least two sets of hop vines 5 (FIG. 1) upwardly to the adjacent row wires 1. As shown in FIG. 2, the vines are trained on the strings 4 and the upper end of each vine is tied to the row wires with twine or the like 6 so that the vine actually hangs from the row wire.

The present machine is designed to pick the vines supported by two adjacent row wires 1 as illustrated in FIG. 2 with the wheels of the machine straddling one row and riding between it and the adjacent rows. It is realized of course that the arrangement of hills, trellis and row wires may be modified and, likewise, the present machine may be adapted to accommodate variations in this arrangement.

Because of the size and relative complexity of machines of the character under consideration, the present machine is illustrated in semi-schematic form since details such as the arrangement of drive shafts, sprockets, framing structure, and the exact location of motors, pumps, pulleys and the like are well within the skill of a mechanic and have nothing to do with the inventive concept of the present invention. Those parts of the machine which are relevant to the description of the present invention have been shown in sufficient detail in order to enable one skilled in the art to construct the same.

Referring to FIG. 1, the mobile machine is self-propelled and is supported by the rear wheels 7 and the steerable front wheels 8. The front and rear wheels may be mounted in any conventional fashion to a suitable machine frame and the rear wheels will be power driven as will presently be described. The machine itself comprises generally the forward picker or stripping unit 9 and the rear cleaning and delivery portion 10. The rear portion 10 may be similar to known portable hop-picking machines such as the well-known Thys Portable Hop-Picking Machine Model 1100 or 1200 with certain modifications which will be described. As illustrated in FIG. 1, the rear portion will include an engine or prime mover 11 for driving the various belts and drums in a known manner and, in the present instance, the engine may be used to drive the hydraulic pumps necessary to pressurize the hydraulic system of the machine. The rear wheels 7 may be driven by a hydraulic motor 12 which is pressurized by pump 12a operated from the conveyor drive presently to be described. In the alternative, any other means deriving its power from the prime mover 11 may be used to drive the rear wheels 7. Although the rear portion 10 of the machine may be similar to conventional machines mentioned, certain of the components for picking have been removed since the initial stripping of the vines is done by the forward portion 9 of the machine. In this embodiment, the rear portion includes a bucket conveyor 13 which is standard equipment on such machines and will be provided with a plurality of limbing drums 14 which operate to further clean the hops as they are carried upwardly on the conveyor 13 in a well-known manner. Limbing drums of the type referred to are illustrated in detail in the E. Thys Pat. No. 2,114,727, or, in the alternative, any known type of cleaning device may be used. In the present invention, the hops, after they are removed from the vines pass upwardly by means of the conveyor 13 and are cleaned on the way by the limbing drums 14 or equivalent means and are deposited in an open area 16 immediately on the back side of the conveyor 13. A second unloading conveyor 17, when operated, serves to discharge the clean hops from the storage area 16 rearwardly through an opening 18 into a waiting truck 19. The truck 19 may be temporarily connected to the self-propelled hop-picking machine so as to trail therebehind in any suitable manner such as by a detachable hitch arrangement. The reason for the storage area 16 is to allow the hop-picking machine to continue picking while a loaded truck is being removed and an empty one pulled in behind the machine and hitched thereto.

The hops which are carried upwardly by the conveyor 13 will fall by gravity into the storage area 16 and the limbs and larger material will be removed by a conventional limb remover 21. The limb remover deposits the limbs onto the belt 22 and they are discharged to the side. If desired, a view screen 23 may be placed on the backside of the conveyor 13 in order to allow the operator on the forward end of the device to observe the position of the truck and the unloading operation. As aforementioned, the portion 10 of the machine may constitute any known portable hop cleaning arrangement without the actual vine stripping or picker assemblies and with the holding area 16 being added thereto.

Figure 3:
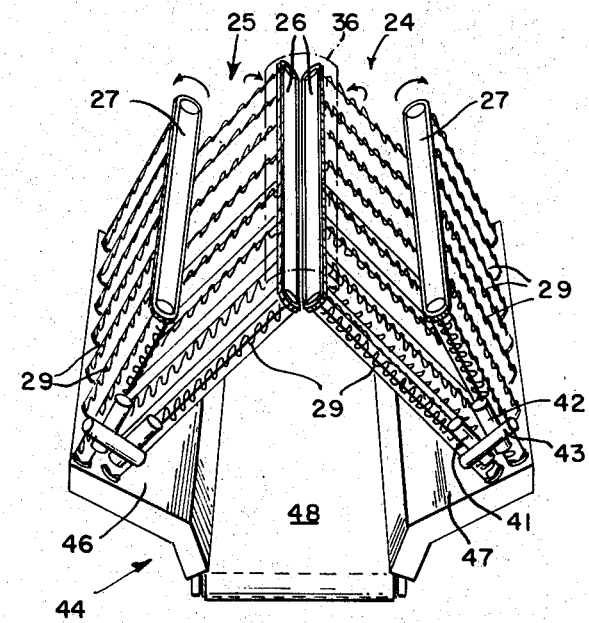
FIG. 3 is a front end perspective view of the picker frames or banks of picking fingers.
Figure 4:
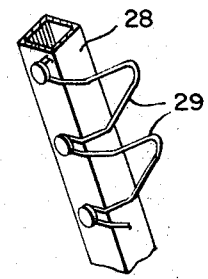
FIG. 4 is a detail view of several picking fingers.

The forward portion 9 of the machine serves to support and enclose the two picker units indicated generally at 24 and 25 in FIG. 3, each of which comprises an inboard picker frame 26 and an outboard picker frame 27. Each of the picker frames mounts an endless picker belt or chain. The picker belts move in a generally horizontal direction and may mount conventional picker bars 28 and conventional picker fingers 29. The detail of a section of a picker bar and a picker finger is illustrated in FIG. 4. These assemblies are well known to the art and detailed description is therefore omitted. As illustrated in FIGS. 1, 2 and 3, the picker frames 26 and 27 are laterally inwardly inclined with the bottom longitudinal edges of the frames being closer together than the top longitudinal edges. This structure enables the device to more easily receive the unpicked vine and to retain it as it is stripped and moves downwardly between the banks of picking fingers. The picker belt or chain may be driven by means of conventional drive shafts and sprockets by individual hydraulic motors if desired. The motors will, of course, be powered by the hydraulic pressure system of the machine, the pump 31 of which may be driven by the engine 11. It will be understood, of course, that alternate drive means may be assembled for driving the picking belts without departing from the inventive concept. The belts or chains will be driven in a direction indicated by the arrows in FIG. 3 so as to move the picking fingers 29 in a direction opposite from that in which the vines are pulled therebetween as will be presently described.

As seen most clearly in FIGS. 1 and 3, the width or vertical height of the outboard picker frames 27 is less than the vertical height of the inboard frames 26. The recommended difference in height is approximately two feet for good results. Thus, with four foot wide outboard picker frames, the inboard frames should be about six feet wide. It will also be observed that both the outboard and inboard frames are sharply inclined rearwardly. Although the rearward inclination may vary somewhat, it should be in the neighborhood of forty-five percent. The effect of the longitudinal rearward inclination of the frames and the increased height of the inboard frames is to cause the vine to be immediately picked up and extended rearwardly by the moving fingers and to retard its tendency to fall directly between the banks of fingers directly on top of the vine then being stripped by the lower portion of the picker frames. Undue pressure on the vines at the lower portion of the picker frames will result in inefficient stripping and discharge or wasting of hops from the picker units. As will be presently described, the upper edge portion of the outboard frames will be provided with deflector members to aid in directing the vines onto the exposed upper portions of the inboard frames.

The outboard runs of the belts of the outboard picking frames 27 will be covered with suitable sheet metal panels as shown at 32 in FIGS. 1 and 2 with the panels including flared top and bottom leading-end portions 33 and 34 respectively for the purpose of directing the vines between the picking frames. Deflector panels 35 extend rearwardly from the members 33 along the length of the upper longitudinal edges of the outboard picker frames 27 and serve to initially direct the hop vine onto the exposed upper edge portion of the inboard frames 26. A curved hood or panel 36 covers the central upper edges of the inboard frames and may be supported in any suitable manner from the machine framework (not shown). In order to prevent binding and to facilitate relative movement between the vines and the picker units as the machine moves forwardly, rollers are located at the front ends of the picker units as shown in FIGS. 2 and 3. As illustrated, each set of picker frames has a set of three rollers, 41, 42 and 43, which may be journaled for free rotation on the picker unit frame as desired.

The unit 9 has a hopper-like bottom indicated generally at 44 in FIG. 3, for collecting the hops as they are stripped from the vines. The bottom structure is provided with inclined side walls 46 and 47 which direct the hops downwardly and onto a conveyor belt 48 for delivery to the bucket conveyor 13. The conveyor belt 48 may be driven by the same drive means as the bucket conveyor or by independent means if desired.

Figure 5:
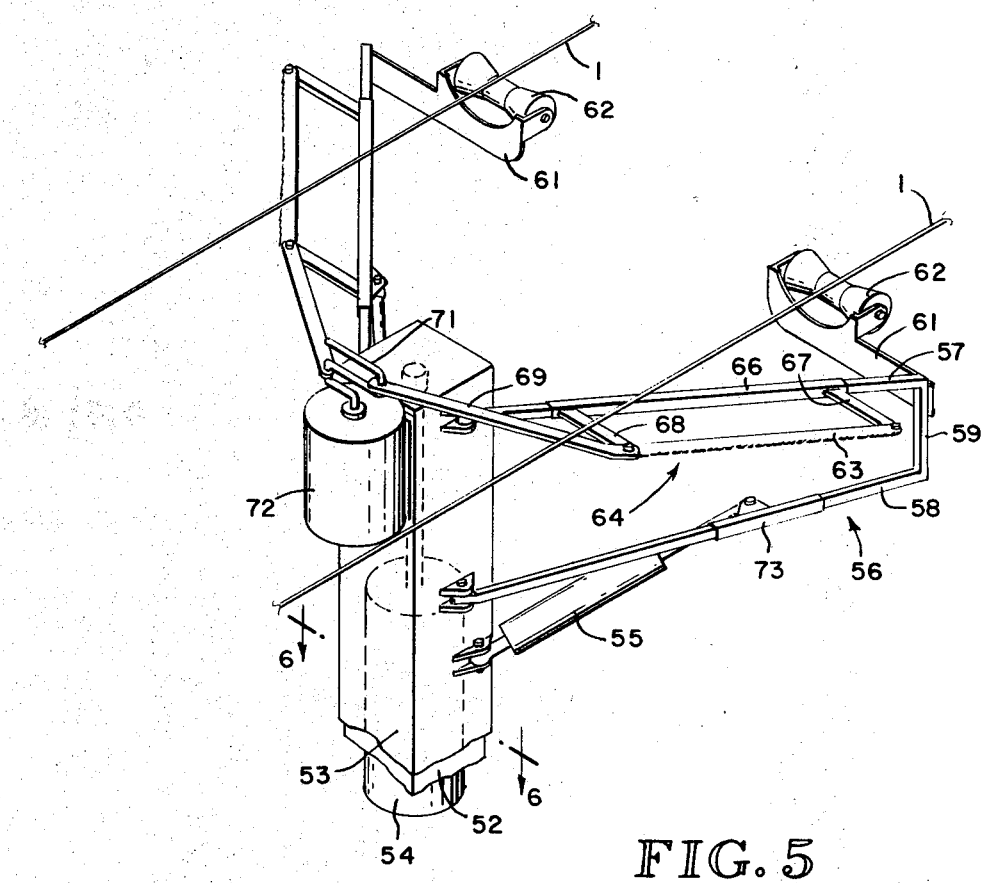
FIG. 5 is a perspective view of the apparatus for releasing the vines from overhead row wires.

Referring to FIGS. 1, 2 and 5, the picker unit 9 also mounts a twine cutter unit, indicated generally at 49 in FIG. 1, which also has provisions for supporting an operator on the platform 51 at the forward end of the picker unit. The entire hop-picking machine may be controlled by the operator from the platform with suitable controls being provided for the hydraulic system and also means for steering the vehicle.

Figure 6:
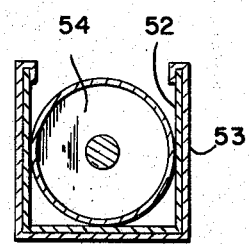
FIG. 6 is a cross-sectional view taken along line 6—6 of FIG. 5.

Referring to FIGS. 5 and 6, a vertical stationary post member 52 supported by the frame of the picker unit serves to mount the telescoping post 53 to which the platform 51 is rigidly attached. The stationary post member 52 has a fixed hydraulic cylinder 54 mounted therein with the piston rod of the cylinder being connected to the outer post 53. Thus, the telescoping outer post member 53 may be raised and lowered in order to contact the row wires as will be presently described. Identical arm structures are swingably mounted on each side of the member 53 and are controlled for lateral position by means of the rams 55 which are pivotally connected to the post member 53 and to the respective arm structures. Since the arm structures on each side of the member 53 are identical, only one will be described in detail. The arm structure indicated generally at 56 is a substantially U-shaped member having the upper and lower legs 57 and 58 respectively. The ends of these legs are pivotally connected to the member 53 as illustrated in FIGS. 2 and 5. The connecting portion 59 of the leg structure serves to adjustably mount a bracket 61 which carries a roller 62 for contacting the row wires 1 to which the twine 6 is attached for supporting the upper ends of the hop vines 5 as shown in FIG. 1. The twine is actually severed by reciprocable saw blades 63 attached to a frame mounted for reciprocation on the upper leg 57 of the arm structure 56. The reciprocal blade-mounting frame 64 comprises a hollow sleeve 66 which rides on the leg member 57 and to which it attached outwardly extending arms 67 and 68 for attaching the blade. The saw blade and the blade frames are reciprocated by means of a connector arm 69 which is caused to rotate by means of the crank arm 71 connected to the drive shaft of the hydraulic motor 72 mounted on the post 53. The arm structures may thus be swung outwardly by the rams 55 pivotably connected to the sleeves 73 and are vertically adjusted by movement of the telescoping post 53 to contact the row wires 1 with the rollers 62.

In operation, the picker unit 9 and cleaning and delivery unit 10 are moved along the row with the wheels 8 straddling the row. The unit 9 picks both strings from each hill of the straddled row and one string of each hill of the adjacent rows. This relationship is shown clearly in FIG. 2. The operator at the station 51 may control operation of the hydraulic motor for propelling the device and may also control the steering of the wheels 8 by such means as conventional power steering. Likewise, the operator has control of the operation of the cleaning and delivery unit 10 and the picking belts and conveyor of the picking unit 9. The post member 53 is initially raised by operation of the hydraulic cylinder 54 and the rams 55 are operated to locate the rollers 52 in contact with the row wires 1. The saw-blades 63 are put into operation by the hydraulic motor 72 and, as the unit advances, the supporting twine 6 for the vines is cut as it is encountered by the saw blades 63. As soon as a vine is cut free, it falls by gravity and is guided between the picking frames of either the picker units 24 or 26. It will be noted that the vine 5 has not been severed but remains attached to the root portion. The vine is initially deflected by the deflector 35 onto the exposed upper portion of the inboard picker frame and the rearwardly moving fingers serve to extend the vine its full length. Since the picker frames are inclined the vine has the tendency to settle slowly between the picker frames insuring that the picker fingers have ample time to strip the vine. Also since the preceding vine will not have been completely removed the retarding action of the inclined frames prevents pressure from being exerted on the lower vine so that it may be easily pulled out as the machine advances. The rollers 41, 42 and 43 insure that the vine does not bind or hang up as it is pulled from between the units. Continued forward movement of the machine completely removes the stripped vines and they are allowed to merely fall to the ground. As the hops are stripped from the vines, they fall downwardly by action of the inclined panels 46 and 47 onto the conveyor belt 48 which delivers them to the bucket conveyor 13 in a conventional manner. Clusters and loose limbs carried upwardly by the bucket conveyor 13 are broken up by the limbing drums 14 which rotate in the opposite direction of the movement of the conveyor in a conventional manner well understood in the art. Upon reaching the upper end of the conveyor, the hops are dumped directly into the holding bin 16 and the limbs are carried by the conveyor 21 onto the limb discharge conveyor belt 22 which discharges the limbs and scrap to one side of the machine. A truck 19 will be initially engaged behind the picker and temporarily attached thereto by any mechanism suitable for engagement and release while the unit is moving. The clean hops are carried from the bin 16 by a delivery or unloading conveyor 17 which discharges the hops to the opening 18 into the truck 19. When a given truck has been loaded, the conveyor 17 will be halted and the hops allowed to accumulate in the bin 16 until another truck has been engaged behind the moving unit. In this manner, it is unnecessary to halt the operation in order to unload the clean hops.

From the foregoing it will be apparent to those skilled in the art that the present invention presents novel and useful improvement in hop-picking machines of the character described. The arrangement and types of structural components utilized within the invention may be subjected to numerous modifications well within the purview of the invention.

The embodiments of the invention in which an exclusive property or privilege is claimed are defined as follows:

1. A hop-picking machine comprising: a mobile frame adapted to be advanced along a row of hop vines in a field, first and second laterally spaced, longitudinally extending picker frames mounted on said mobile frame, said picker frames having laterally inclined picker belts for combing hop vines in a rearward generally longitudinal direction, the lower longitudinal edges of the frames being spaced apart a distance less than the spacing between the upper longitudinal edges, the picker frames being inclined in a rearward direction, and guide means located between said frames at the forward lower corners thereof, whereby a hop vine deposited in a generally elongated condition between said frames and extending generally longitudinally therewith will be combed in a rearward direction as it falls by gravity and be pulled forwardly from between the frames over said guide means as the machine advances.

2. The hop-picking machine according to claim 1 including: hop-receiving means on said mobile frame located beneath said picker frames for collecting hops stripped from the vines by said picker frames, and conveyor means in said receiving means to remove the hops therefrom.

3. The hop-picking machine according to claim 2 including: a fixed mounting member carried on said mobile frame adjacent the forward portion thereof, a second mounting member carried for vertical reciprocation on said fixed mounting member and extending above the level of said picker frames, platform means carried by said second mounting member for supporting a machine operator, and twine-cutting means mounted on said second mounting member for releasing the vines from an overhead wire.

4. The combination according to claim 3 including: a hop-cleaning unit mounted on said mobile frame and adapted to receive hops from said conveyor, said hop-cleaning unit including means to clean said hops and to discharge the cleaned hops therefrom, storage container means associated with said unit for receiving the cleaned hops, and selectively operable conveyor means for discharging the hops from said storage container.

5. A hop-picking machine comprising: a mobile frame adapted to be advanced along a row of hop vines in a field, first and second laterally spaced, longitudinally extending picker frames mounted on said mobile frame, said picker frames having picker belts for combing hop vines in a rearward generally longitudinal direction, said frames being inclined from the vertical in a common lateral direction with one overlying the other, the lower longitudinal edges of the frames being spaced apart a distance less than the spacing between the upper longitudinal edges, said picker frames being inclined in a rearward direction, the overlying picker frame having a width less than the width of the other frame, and anti-friction guide means located at the forward lower corner portions of the frames, whereby a hop vine deposited between said frames will be combed in a rearward direction as it falls by gravity and be pulled forwardly from between the frames over said guide means as the machine advances.

6. The hop-picking machine according to claim 5 including: a deflector member extending along the upper longitudinal edge of said overlying picker frame, said deflector member being inclined in a lateral direction opposite the direction of inclination of said overlying picker frame, whereby vines deposited between said frames will be deflected onto the exposed upper longitudinal edge portion of the other frame.

7. The hop-picking machine according to claim 6 wherein: said first and second picker frames comprise a first set of picker frames, and including: a second set of picker frames identical to said first set, said second set of frames being inclined laterally in the opposite direction from said first set, whereby said machine is adapted to straddle a row of hop vines and to receive vines located on both sides of the longitudinal axis of said machine.

8. The hop-picking machine according to claim 7 including: hop receiving means on said frame located beneath said first and second sets of picker frames for collecting hops stripped from the vines by both sets of picker frames, and conveyor means in said receiving means to remove the hops therefrom.

9. The hop-picking machine according to claim 8 including: a fixed mounting member carried on said frame adjacent the forward portion thereof and between said sets of picker frames, a second mounting member carried for vertical reciprocation on said fixed mounting member and extending above the level of said picker frames, platform means carried by said second mounting member for supporting a machine operator, and twine-cutting means mounted on said second mounting member for releasing the vines from overhead row wires on both sides of the longitudinal axis of the machine.

10. The hop-picking machine according to claim 9 including: a hop-cleaning unit mounted on said mobile frame and adapted to receive hops from said conveyor, said hop-cleaning unit including means to clean said hops and to discharge the cleaned hops therefrom, storage container means associated with said unit for receiving the cleaned hops, and selectively operable conveyor means for discharging the hops from said storage container.

11. The hop-picking machine according to claim 5 wherein: said anti-friction guide means comprises a plurality of idler rollers.

References Cited

UNITED STATES PATENTS

| | | | |
|---|---|---|---|
| 2,114,727 | 4/1938 | Thys | 130—30 |
| 2,447,122 | 8/1948 | Horst | 56—130 |
| 2,466,089 | 4/1949 | Esch | 56—130 |
| 2,645,893 | 7/1953 | Horst | 130—30 X |

FOREIGN PATENTS 167,707    5/1956    Australia.

LOUIS G. MANCENE, Primary Examiner

J. A. OLIFF, Assistant Examiner

U.S. Cl. X.R.
56—330; 130—30